(12) United States Patent
Porter et al.

(10) Patent No.: US 7,953,517 B1
(45) Date of Patent: May 31, 2011

(54) LANDSCAPE CONTROLLER WITH CONTROL PANEL INSERTABLE FEATURE MODULE

(75) Inventors: La Monte D. Porter, San Marcos, CA (US); Peter J. Woytowitz, San Diego, CA (US)

(73) Assignee: Hunter Industries, Inc., San Marcos, CA (US)

( * ) Notice: Subject to any disclaimer, the term of this patent is extended or adjusted under 35 U.S.C. 154(b) by 310 days.

(21) Appl. No.: 12/243,897

(22) Filed: Oct. 1, 2008

(51) Int. Cl.
*G05D 11/00* (2006.01)
*G05D 7/00* (2006.01)
(52) U.S. Cl. ........................................................ 700/284
(58) Field of Classification Search .................. 700/284, 700/16; 239/13
See application file for complete search history.

(56) References Cited

U.S. PATENT DOCUMENTS

| | | | |
|---|---|---|---|
| 4,937,732 A * | 6/1990 | Brundisini ...................... 700/16 |
| 5,097,861 A | 3/1992 | Hopkins et al. .............. 137/78.3 |
| 5,262,936 A | 11/1993 | Faris et al. .................... 364/140 |
| 5,287,888 A | 2/1994 | Geiger ....................... 137/624.2 |
| 5,444,611 A | 8/1995 | Woytowitz et al. ........... 364/145 |
| 5,479,338 A * | 12/1995 | Ericksen et al. ................ 700/16 |
| 5,602,728 A | 2/1997 | Madden et al. ............... 364/145 |
| 5,748,466 A | 5/1998 | McGivern et al. ........... 364/146 |
| 5,921,280 A | 7/1999 | Ericksen et al. ......... 137/624.11 |
| 5,956,248 A | 9/1999 | Williams et al. ................ 700/16 |
| 6,088,621 A | 7/2000 | Woytowitz ...................... 700/16 |
| 6,240,336 B1 | 5/2001 | Brundisini ..................... 700/284 |
| 6,452,499 B1 | 9/2002 | Runge et al. .................. 340/601 |
| 6,459,959 B1 | 10/2002 | Williams et al. .............. 700/284 |
| 6,600,971 B1 | 7/2003 | Smith et al. ................... 700/284 |
| 6,685,104 B1 | 2/2004 | Float et al. ....................... 239/69 |
| 6,708,084 B2 | 3/2004 | Battistutto et al. ............ 700/284 |
| 6,721,630 B1 | 4/2004 | Woytowitz .................... 700/284 |
| 6,766,221 B1 | 7/2004 | Christiansen ................. 700/284 |
| 6,772,050 B2 | 8/2004 | Williams et al. .............. 700/284 |
| 6,842,667 B2 | 1/2005 | Beutlet et al. ................. 700/284 |
| 6,898,467 B1 | 5/2005 | Smith et al. ..................... 700/20 |
| 6,967,565 B2 * | 11/2005 | Lingemann ................ 340/12.23 |
| 7,050,887 B2 * | 5/2006 | Alvarez ......................... 700/284 |
| 7,058,478 B2 * | 6/2006 | Alexanian ..................... 700/284 |
| 7,058,479 B2 * | 6/2006 | Miller ............................ 700/284 |
| 7,069,115 B1 | 6/2006 | Woytowitz .................... 700/284 |
| 7,229,026 B2 * | 6/2007 | Evelyn-Veere ................. 239/11 |
| 7,257,465 B2 | 8/2007 | Perez et al. .................... 700/284 |
| 7,412,303 B1 | 8/2008 | Porter et al. ................... 700/284 |
| 7,444,207 B2 * | 10/2008 | Nickerson et al. ............ 700/284 |
| 7,613,546 B2 | 11/2009 | Nelson et al. ................. 700/284 |
| 7,640,079 B2 * | 12/2009 | Nickerson et al. ............ 700/284 |
| 7,844,367 B2 * | 11/2010 | Nickerson et al. ............ 700/284 |
| 7,844,369 B2 * | 11/2010 | Nickerson ..................... 700/284 |
| 2002/0060631 A1 | 5/2002 | Runge et al. .................. 340/602 |
| 2002/0091452 A1 | 7/2002 | Addlink et al. ................. 700/19 |
| 2005/0038529 A1 | 2/2005 | Perez et al. ..................... 700/19 |
| 2005/0267641 A1 | 12/2005 | Nickerson et al. ............ 700/284 |
| 2005/0273205 A1 | 12/2005 | Nickerson et al. ............ 700/284 |

(Continued)

*Primary Examiner* — Crystal J Barnes-Bullock
(74) *Attorney, Agent, or Firm* — Michael H. Jester

(57) ABSTRACT

A landscape controller includes a housing and a control panel in the housing. The control panel includes a display and at least one manual control that enables a user to enter and/or select a watering schedule. A memory is provided for storing an operational program for carrying out the watering schedule. A processor is connected to the memory and is capable of executing the operational program. A connecting device in the control panel operatively connects at least one feature module to the processor. The controller further includes station control circuitry controlled by the processor that enables the processor to selectively energize a plurality of valves to deliver water to sprinklers in accordance with the watering schedule.

13 Claims, 16 Drawing Sheets

U.S. PATENT DOCUMENTS

| | | | |
|---|---|---|---|
| 2006/0030971 A1 | 2/2006 | Nelson et al. | 700/284 |
| 2006/0100747 A1 | 5/2006 | Runge et al. | 700/284 |
| 2007/0208462 A1 | 9/2007 | Kah | 700/284 |
| 2007/0282486 A1 | 12/2007 | Walker et al. | 700/284 |
| 2008/0027587 A1 | 1/2008 | Nickerson et al. | 700/284 |
| 2008/0071426 A1 | 3/2008 | Perez et al. | 700/284 |
| 2008/0125917 A1 | 5/2008 | Walker et al. | 700/284 |
| 2009/0276102 A1* | 11/2009 | Smith et al. | 700/284 |
| 2009/0281672 A1* | 11/2009 | Pourzia | 700/284 |
| 2010/0030389 A1* | 2/2010 | Palmer et al. | 700/284 |

* cited by examiner

LANDSCAPE CONTROLLER WITH CONTROL PANEL INSERTABLE FEATURE MODULE

FIELD OF THE INVENTION

The present invention relates to residential and commercial irrigation systems used with turf and landscaping, and more particularly to irrigation controllers that execute watering schedules and other landscape related functions in accordance with an operational program.

BACKGROUND OF THE INVENTION

Electronic irrigation controllers have long been used on residential and commercial irrigation sites to water turf and landscaping. They typically comprise a plastic housing that encloses circuitry including a processor that executes a watering program. Watering schedules are typically manually entered or selected by a user with pushbutton and/or rotary controls while observing an LCD display. The processor turns a plurality of solenoid actuated valves ON and OFF with solid state switches in accordance with the watering schedules that are carried out by the watering program. The valves deliver water to sprinklers connected by subterranean pipes.

Irrigation controllers are manufactured with a wide range of sizes and features. Large irrigation controllers are typically used in commercial applications, golf courses, playing fields and parks. Large irrigation controllers have the capability of watering many zones, e.g. fifty zones or more, and sometimes have sophisticated features not found in smaller irrigation controllers used in residential applications. For example, large irrigation controllers may have built-in capability for turning sprinklers on and off to optimize the flow of water through the irrigation pipes while meeting the irrigation requirements of the property The features provided by irrigation controllers continue to evolve to accommodate more complex landscapes and continuously developing strategies to manage water and energy more effectively. Irrigation controllers used in the professional market place tend to be relatively expensive and labor intensive to replace as new feature are introduced. There is a growing need to provide different features on different sites. From a cost standpoint, homeowners and professionals do not want to pay for features they do not require. There is also a need to develop irrigation controllers that meet multiple needs of a landscaped property besides just irrigating plants.

At the present time homeowners and professionals can only purchase irrigation controllers with the capability of adding station modules to increase the number of zones, but without feature upgrade capability. This forces distributors to stock a wide range of irrigation controllers which adds the cost of carrying a large inventory of different types of irrigation controllers. Moreover, as the irrigation needs of a particular landscape site change and/or as government imposes more water usage restrictions, homeowners and professionals are sometimes forced to buy entirely new irrigation controllers.

SUMMARY OF THE INVENTION

In accordance with the present invention a landscape controller includes a housing and a control panel on the housing. The control panel includes a display and at least one manual control that enables a user to enter and/or select a watering schedule. A memory is provided for storing an operational program for carrying out the watering schedule. A processor is connected to the memory and is capable of executing the operational program. A connecting device in the control panel operatively connects at least one feature module to the processor. The controller further includes station control circuitry controlled by the processor that enables the processor to selectively energize a plurality of valves to deliver water to sprinklers in accordance with the watering schedule.

DETAILED DESCRIPTION

Figure 1:
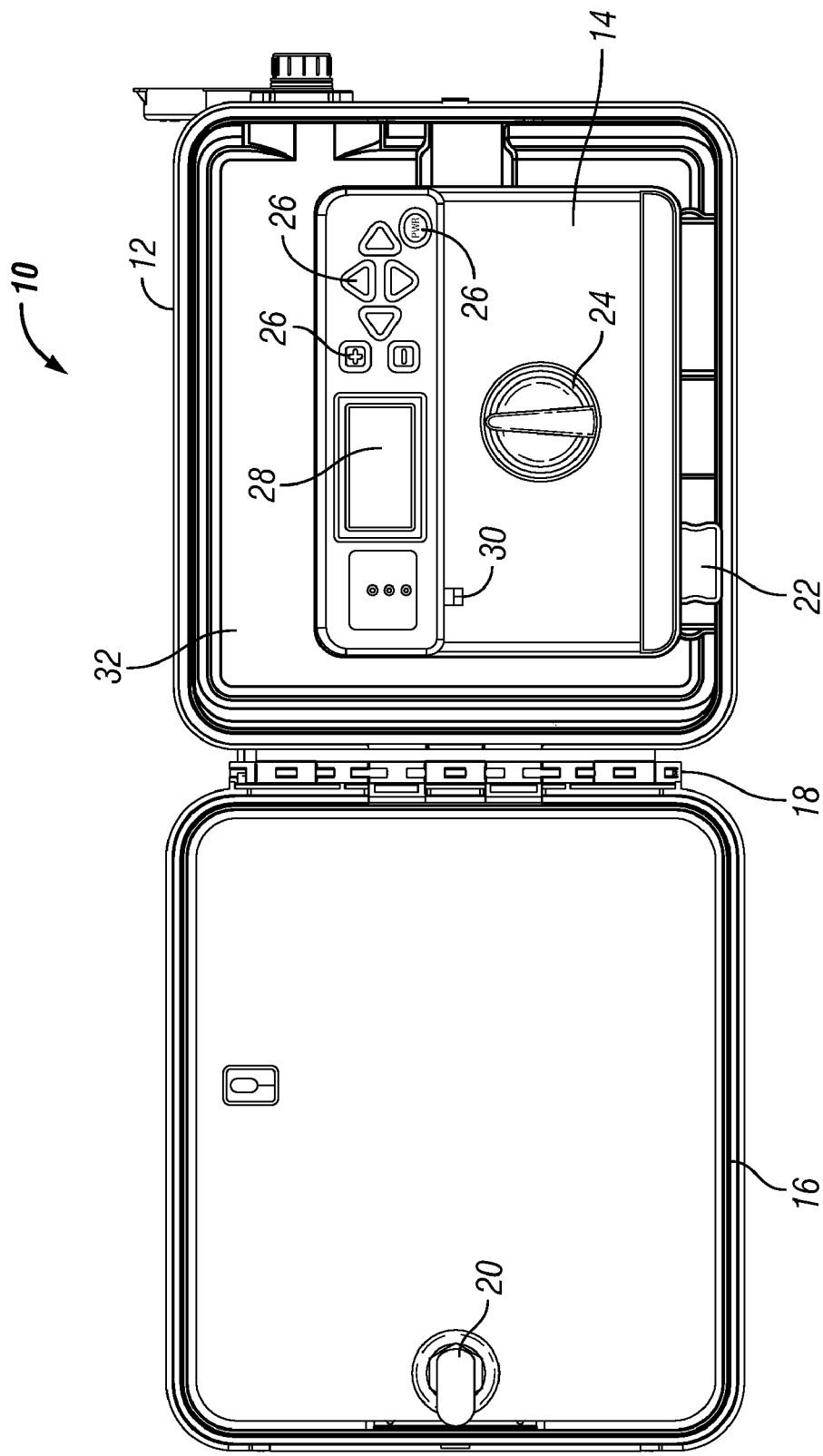
FIG. 1 is a front elevation view of a landscape controller in accordance with an embodiment of the present with its front door open to reveal its removable face pack.

The entire disclosures of the following U.S. patents and U.S. patent applications are hereby incorporated by reference: U.S. Pat. No. 5,097,861 granted Mar. 24, 1992 of Larry K. Hopkins et al. entitled IRRIGATION METHOD AND CONTROL SYSTEM; U.S. Pat. No. 5,444,611 granted Aug. 22, 1995 of Peter J. Woytowitz, et al. entitled LAWN AND GARDEN IRRIGATION CONTROLLER; U.S. Pat. No. 6,088,621 granted Jul. 11, 2000 of Peter J. Woytowitz et al. entitled PORTABLE APPARATUS FOR RAPID REPROGRAMMING OF IRRIGATION CONTROLLERS; U.S. Pat. No. 6,842,667 granted Jan. 11, 2005 of Beutler et al. entitled POSITIVE STATION MODULE LOCKING MECHANISM FOR EXPANDABLE IRRIGATION CONTROLLER; U.S. Pat. No. 7,069,115 granted Jun. 27, 2007 of Peter J. Woytowitz entitled HYBRID MODULAR/DECODER IRRIGATION CONTROLLER; U.S. Pat. No. 7,412,303 granted Aug. 12, 2008 of LaMonte D. Porter et al. and entitled EVAPOTRANSPIRATION UNIT FOR RE-PROGRAMMING AN IRRIGATION CONTROLLER; pending U.S. patent application Ser. No. 11/748,356 filed May 14, 2007 of La Monte D. Porter entitled IRRIGATION CONTROLLER WITH INDIRECTLY POWERED STATION MODULES; and pending U.S. patent application Ser. No. 12/181,894 filed Jul. 29, 2008 of Peter J. Woytowitz et al. entitled IRRIGATION SYSTEM WITH ET BASED SEASONAL WATERING ADJUSTMENT. The aforementioned U.S. patents and applications are all assigned to Hunter Industries, Inc., the assignee of the subject application.

It would be highly desirable in the irrigation controller marketplace to be able to modify and/or add to features within an existing irrigation controller to customize the irrigation controller for a particular site. It would also be desirable to meet the changing watering needs of the particular irrigation site by allowing an irrigation controller to be upgraded. The present invention provides a landscape controller that can be easily and economically configured and/or upgraded by the user to meet the specific needs of the associated irrigation site. This is accomplished by installing at least one feature module that communicates with the processor of the landscape controller and alters the operational program, changes a functionality of an operational program executed by the processor, and/or provides additional memory capacity. The term "landscape controller" as used herein refers to a device which can function as an irrigation controller, and optionally perform additional functions on a site besides watering, such as the control of landscape lights and water features.

The present invention allows the homeowner or professional to purchase a base controller with only the features needed for his or her particular irrigation site. Features can easily be added at a later date to the installed landscape controller. Landscape controllers can thus be readily and economically tailored to meet the different needs of different sites. Distributors can carry a smaller inventory of controllers and still meet the needs of a wide range of customer demands.

The feature module of the present invention is installed into the control panel portion of the controller that typically contains the processor, display and manual controls where the user enters watering schedules. The feature module can have various designs to meet particular needs. One form of the feature module is a simple electronic key that enables and/or disables features already programmed into the existing memory of the landscape controller. Another form of feature module provides additional memory, thereby allowing the processor to handle more complex tasks not otherwise capable of being performed by the base controller, such as a memory intensive data logging feature. The feature module may contain new programs that are down loaded into the landscape controller and change the functionality of the operational program executed by the processor, thereby enhancing, adding to and/or otherwise changing the functional irrigation features available to the user, such as providing the capability of modifying watering schedules based on ET data, or optimizing the flow of water through the irrigation pipes In addition to just changing programming in the controller, the feature module may facilitate expanded communications, e.g. wireless communications with an external rain sensor, a soil moisture sensor, or a weather station, and other capabilities such as controlling a pump relay, landscape lighting and aesthetic water features such as an electric water fountain. Therefore, instead of using the term "watering program" to refer to the overall program executed by the processor to carry out watering schedules, that code is referred to herein using the term "operational program." The stored watering program includes a comprehensive set of functional irrigation features and the feature module can be configured to unlock less than all of the functional irrigation features. The feature module and the operational program can be configured so that the feature module can only unlock predetermined functional irrigation features on a predetermined controller and not other controllers. This prevents customers from undercutting the sales of controllers with enhanced features by loaning his feature module to other customers and unlocking the desired features. The feature module can be configured so that the irrigation controller will only execute specified functions so long as that feature module is plugged into the control panel. The feature module can simultaneously unlock certain functional irrigation features stored in the landscape controller and add additional functional irrigation features not found in the firmware originally present in the program memory of the landscape controller. The landscape controller of the present invention can be partially or entirely re-programmed through the feature module years after installation to incorporate many new utilities not previously available on the controller.

Figure 2:
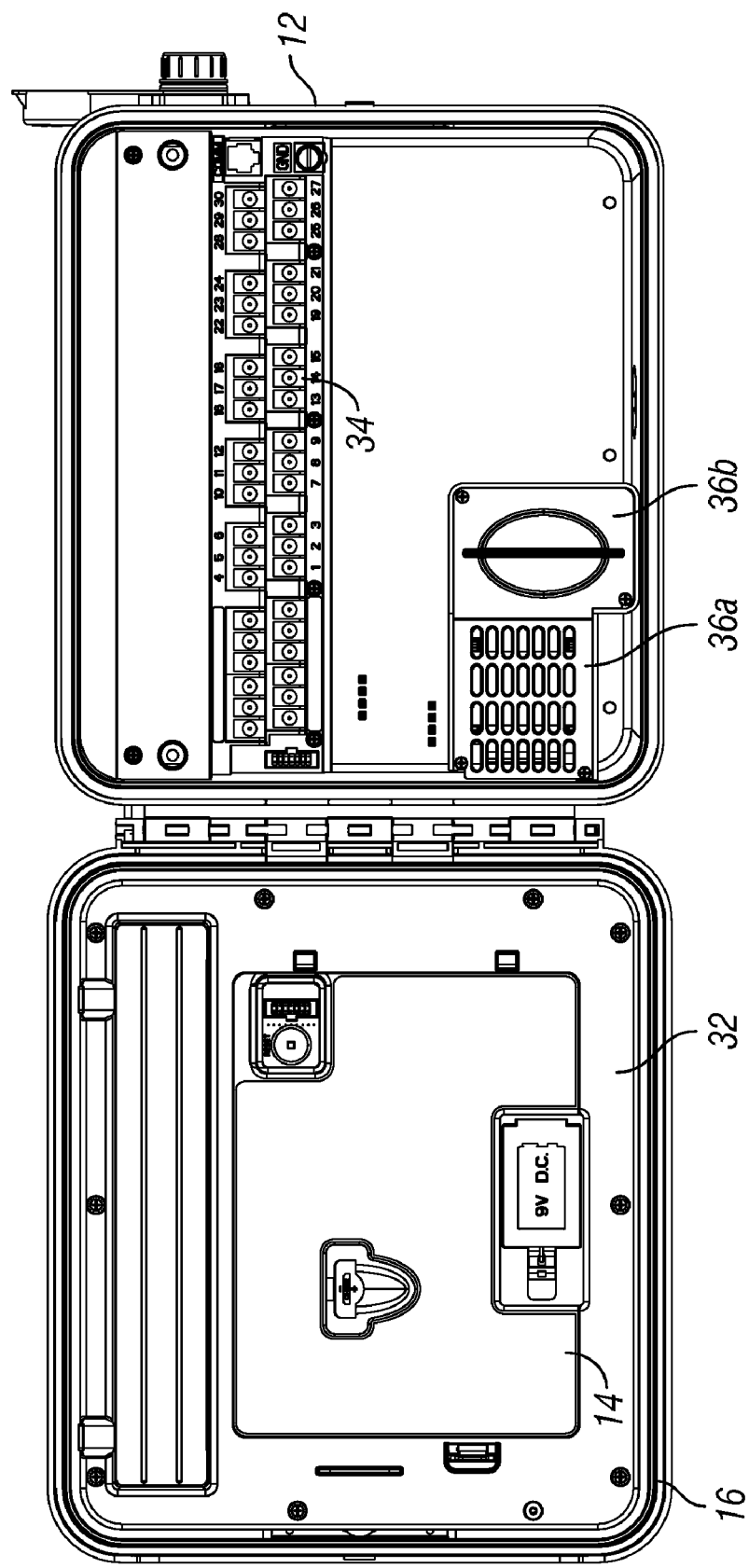
FIG. 2 is a front elevation view of the landscape controller of FIG. 1 with its face pack carrying frame swung open to reveal the screw type wire connectors and other components mounted in its rear panel.

Referring to FIGS. 1 and 2, in accordance with an embodiment of the present invention, a landscape controller 10 includes a rectangular housing or back panel 12 in which a control panel in the form of a face pack 14 is removably mounted. A door 16 mounted on a hinge assembly 18 may be swung closed to seal and protect the face pack 14 and the electronics mounted in the back panel that interact with the face pack 16. The door 16 may be secured in its closed position by actuating a key lock 20 mounted on the door with a key (not illustrated). A feature module 22 is shown plugged into a slot formed in the bottom edge of the face pack 14. The face pack 14 has manual controls that enable a user to enter and/or select a watering schedule, including a rotary switch 24 and seven push button switches 26. The face pack further includes a liquid crystal display (LCD) 28 that provides a graphical user interface (GUI) and a slide switch 30 that enables a user to bypass an optionally installed rain sensor. The face pack 14 is removably mounted in a rectangular receptacle formed in a rectangular frame 32 connected to the hinge assembly 18. The face pack 14 is held in place in the frame by releasable latches (not visible). After the door 16 has been swung to its open position, the frame 32 can be swung to its open position illustrated in FIG. 2, revealing a plurality of screw type wire connectors 34 mounted in the back panel 12 used to connect wires to valves, sensors, lights and pump relays, and other auxiliary devices. A transformer 36a is also mounted in the back panel 12. A wiring enclosure 36b is adjacent to the transformer to provide an area to make wiring connections from the outside power source.

Figure 3A:
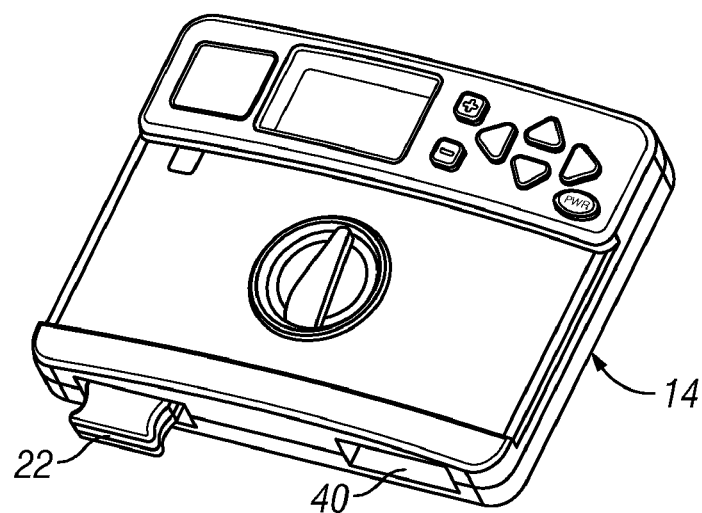
FIG. 3A is an isometric view of the face pack of the landscape controller of FIG. 1 removed from the frame and rear housing and with a single feature module plugged into the left slot in its lower edge.
Figure 3B:
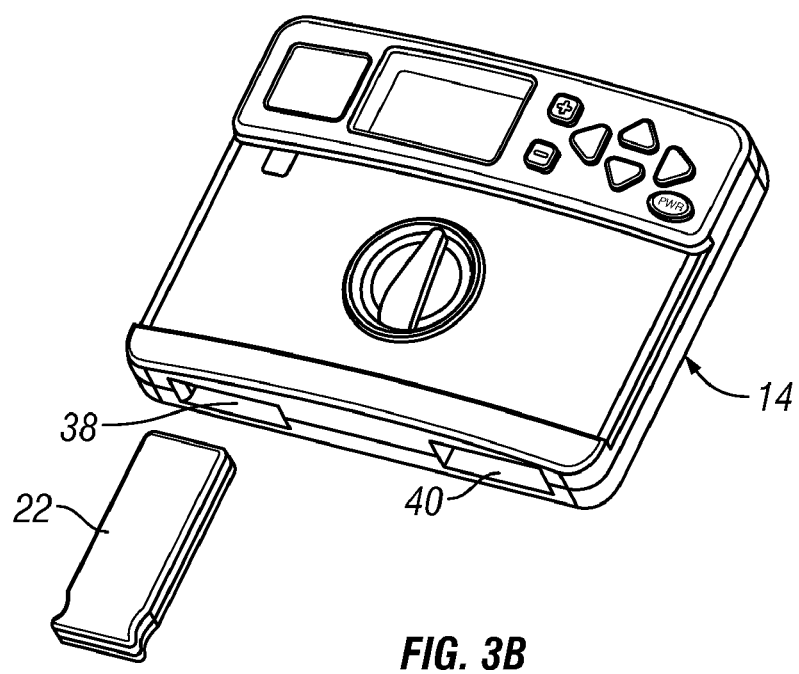
FIG. 3B is view of the face pack of the landscape controller of FIG. 1 showing the feature module removed from its slot.

Referring to FIGS. 3A and 3B, various feature modules, such as 22 can be removably inserted in one of two slots 38 and 40 formed in the bottom edge of the face pack 14. The first portion of the connecting device on each feature module is located on the forward end thereof for mating with the second portion of the connecting device which is located in the end of the slot.

Figure 4:
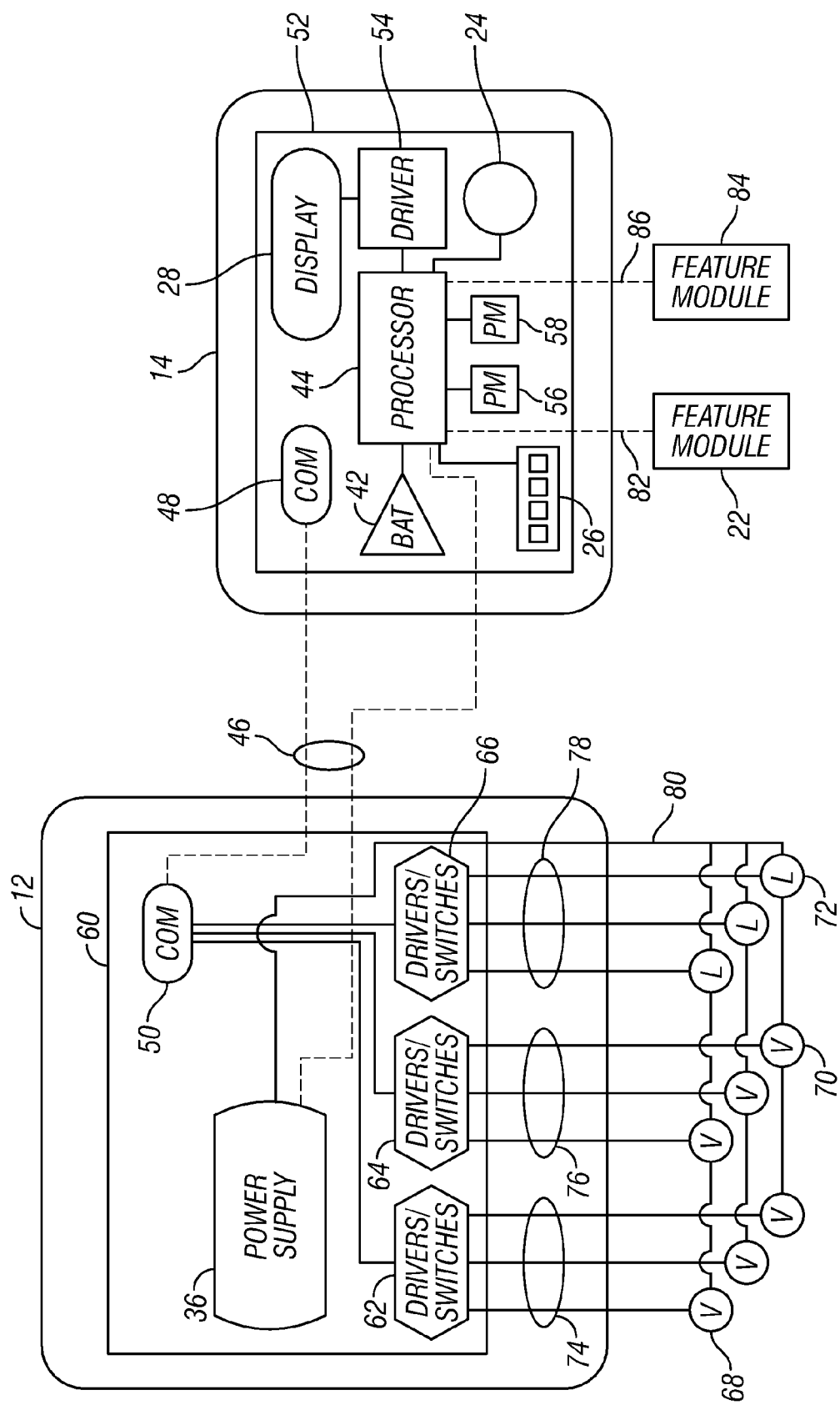
FIG. 4 is a block diagram of the landscape controller of FIG. 1.

Referring to FIG. 4, the removable face pack 14 includes a portable power source 42 in the form of a battery so that watering schedules can be created or modified when the face pack 14 has been removed from the frame 32 and a person is carrying the face pack 14 around the landscape site. When the face pack 14 is mounted in the frame 32, its processor 44 receives power from the power supply 36 through mating multi-pin electro-mechanical connectors (not illustrated) and a ribbon cable 46 illustrated diagrammatically as dashed lines in FIG. 4. Similarly, when the face pack 14 is mounted in the frame 32, a first communications link 48 in the face pack 14 establishes communications capability with a second communications link 50 in the back panel 12 through the ribbon cable 46. The communications link between the face pack 4 and the circuitry in the back panel 14 could alternatively be established indirectly by suitable means such as mating optical emitter/detector pairs or RF connection. The electronic components of the face pack 14 are mounted on a first printed circuit board 52. A driver 54 mounted on the printed circuit board 52 is connected between the processor 44 and the LCD 28. The processor 44 communicates with a program memory (PM) 56 and a data memory (DM) 58. The processor, PM 56 and DM 58 could be provided by a single chip computer.

The back panel 12 houses a second printed circuit board 60 that functions as a so-called "back plane." The printed circuit board 60 mechanically supports and/or electrically interconnects the second communications link 50, power supply 36 and station control circuitry in the form of driver/switch circuits 62, 64 and 66. The processor 44 executes an operation program, including a watering program, that is stored in PM 56 in order to carry out the desired watering schedules and any other functions such as turning landscape lighting on and off. By activating the driver/switch circuits 62, 64 and 66 via communications link 50. The driver/switch circuits 62, 64 and 66 are conventional and may include transistor drivers responsive to ON and OFF commands from the processor 44 that turn triacs ON and OFF to switch low voltage AC power from power supply 36. The driver/switch circuits 62, 64 and 66 control six irrigation valves 68 and 70, and three landscape lights 72 that are connectable to dedicated field lines 74, 76 and 78 and a common return line 80 via screw terminals 34 (FIG. 2). The processor 44 could also control a pump relay (not illustrated) through one of the driver/switch circuits 62, 64 or 66. The power supply 36 is conventional in form and its input is connected to standard 115 or 230 volt AC power and its output supplies the low voltage AC power for the valves 68, 70 and 72 as well as the low voltage DC power required by the electronic components on the printed circuit board 52 in the face pack 14.

Referring still to FIG. 4, the feature module 22 is operatively connected to the processor 44 in the face pack 14 via any suitable connecting device 82 which is illustrated diagrammatically by a phantom line in FIG. 4. These may be male and female multi-pin electrical connectors, card edge connectors, optical connectors or any other suitable connecting devices used in the world of consumer electronics devices with removable components. FIG. 4 illustrates a second removable feature module 84 operatively connected to the processor 44 via a second connecting device 86. The landscape controller of the present invention advantageously operates with feature modules 22 and 84 that are operatively connectable to the processor 44 through a communications path that does not include the backplane 60.

The operational program stored in the PM 56 includes a watering program having all of the features and algorithms necessary to satisfy multiple irrigation controller market segments. The watering program includes scheduling code for sports field application, as well as nursery application. Additional code allows the watering program to make adjustments based on evapotranspiration (ET) data supplied to the processor 44 from a service or from environmental sensors. Different feature modules 22 may be manufactured for installation in the face pack 14 that each enable or activate for usage a predetermined sub-set of a comprehensive set of features capable of being executed by the processor 44. The different feature modules can enable, through unique keys stored on an integrated circuit, different feature sets for different irrigation controller market segments. The most expensive feature module may enable the processor 44 to execute every available feature. Thus, the feature module 22 that is inserted into the face pack 14 enables a predetermined specific set of instructions that implement a comprehensive set of features capable of being executed by the processor 44. In this way, the user only pays for the features needed on his or her particular irrigation site.

Our invention allows a user to buy the base landscape controller 10 and the desired feature set that is enabled by a specific one of several interchangeable feature modules 22. The user can only access a predetermined sub-set of the comprehensive set of features capable of being executed by the processor 44 that are included in the extensive operational program stored in the PM 56 of the face pack. The manufacturer's software engineers only need to write one comprehensive watering program, instead of different watering programs for irrigation controllers targeted at different market segments. Field upgrades can be accomplished by simply purchasing and installing a new feature module 22. Since the feature module is plugged into the face pack 14, all of the authorized functionality of the landscape controller is fully available to the user when the face pack is unplugged from the frame 32 so that the user can walk around the irrigation site, change the water schedule, and make other adjustments.

U.S. Pat. No. 7,257,465 of Perez et al. discloses a modular irrigation controller with a removable face pack. The controller has a number of bays or receptacles in its rear panel into which a plurality of station modules may be individually plugged to increase the number of zones that can be watered. These station modules are not plugged into the removable face pack but are instead plugged into the receptacles so as to allow the station modules to electrically connect to the back plane in the rear panel. So-called "smart" modules can be plugged into these receptacles, such as an ET module or a decoder module, in order to provide additional functionality to the base irrigation controller. However, this irrigation controller architecture suffers from a number of drawbacks. First of all, each time a smart module is plugged into one of the receptacles in the rear panel, the number of zones that can potentially be controlled is correspondingly reduced since that receptacle is no longer available to receive a station module. Secondly, since the smart modules are not plugged into the face pack, the processor in the face pack may not be able to be programmed using all of the additional functionality provided by the smart modules when the face pack is unplugged from the rear housing. Thirdly, the smart modules disclosed in U.S. Pat. No. 7,257,465 of Perez et al. have no capability for unlocking or enabling otherwise non-available features programmed into the main memory of the base controller. The landscape controller of the present invention overcomes each of these shortcomings.

The primary purpose of an alternate feature module 22 can be the provision of additional memory, or data via that memory, to the face pack 14. For instance, once the processor 44 detects that additional memory has been plugged into the face pack 14, it may enable a memory intensive data logging function not previously possible with the DM 58 in the face pack. Alternatively, the processor 44 may allow more complex programming when there is additional memory available to store more start times, run times, etc. Yet another use of the additional memory is to provide the processor 44 with data. For instance, a memory chip in the feature module 22 may be pre-loaded with historic environmental conditions to allow automatic watering schedule changes. This historic data may be historic average daily ET data for a particular zip code, for example. See U.S. patent application Ser. No. 12/176,936 filed Jul. 21, 2008, the entire disclosure of which is hereby incorporated by reference. A new version of application code may later be developed for the face pack 14. Microcontrollers are currently available for use as the processor 44 that have the ability to write to their own memory (re-flashable). Such a microcontroller can read the information out of the memory in the feature module 22, and re-program itself.

Figure 5:
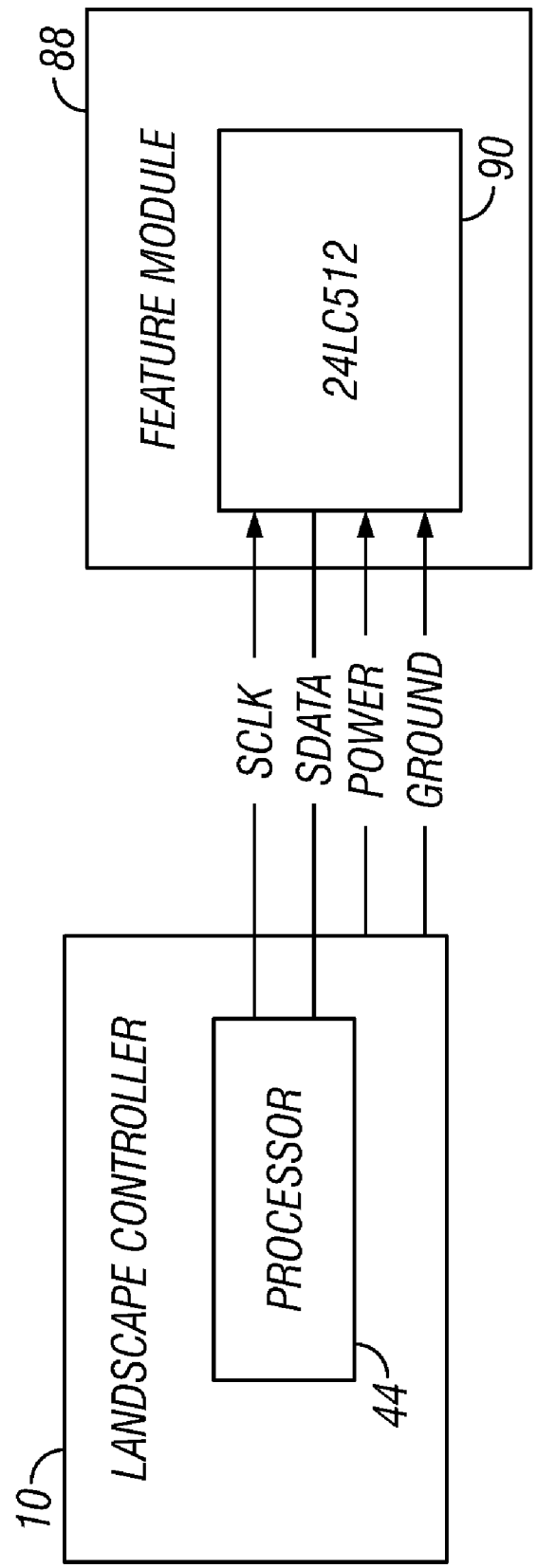
FIG. 5 is a block diagram of the landscape controller of FIG. 1 connected to a feature module with a serial memory.
Figure 6:
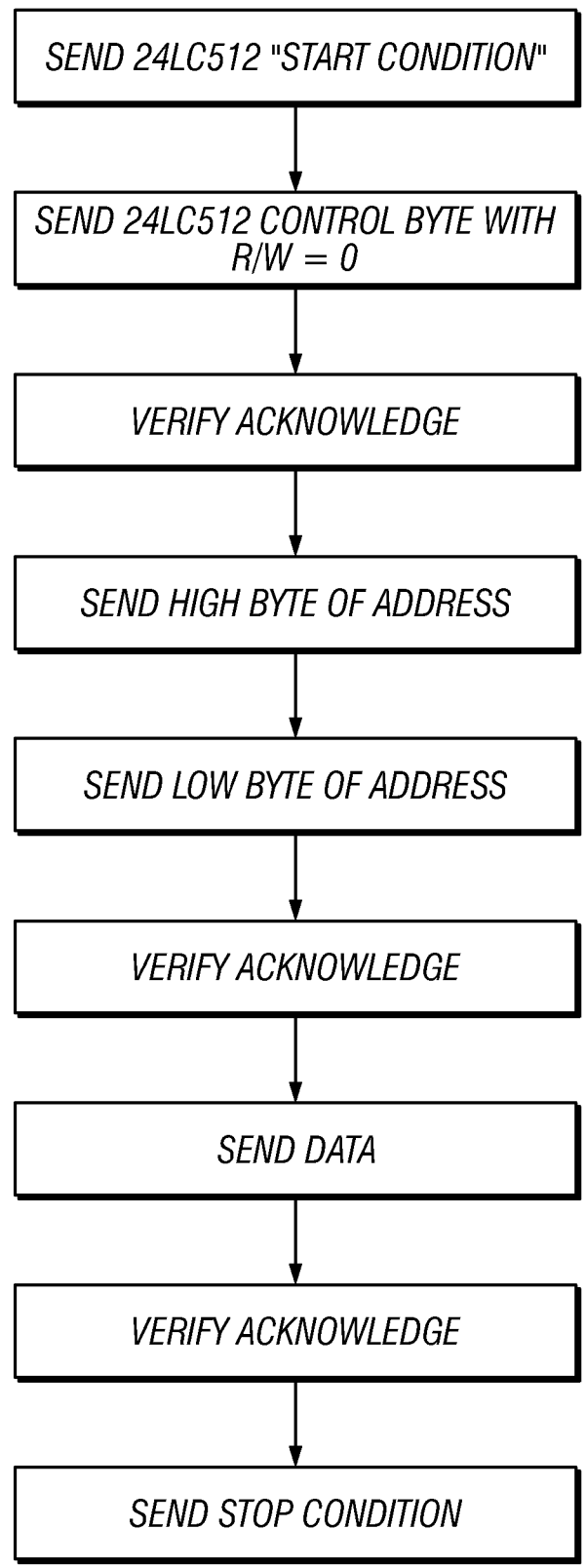
FIG. 6 is a flow diagram illustrating a method of writing a byte of data to the serial memory chip inside the feature module of FIG. 5.
Figure 7:
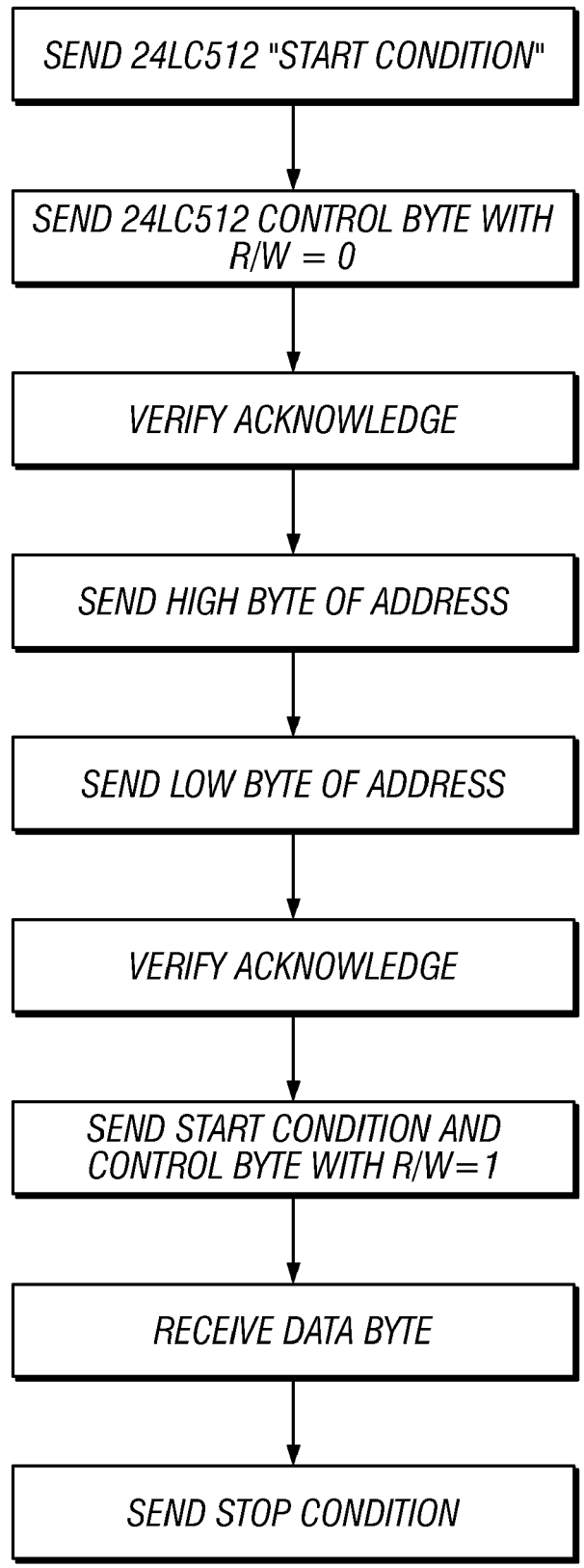
FIG. 7 is flow diagram illustrating a method of reading a byte of data from the serial memory chip inside the feature module of FIG. 5.

The feature module 22 can contain a variety of different types of memory that can be accessed by the processor 44 in a number of different ways. Serial memory can be accessed with only a few lines. In most cases, these consist of only a clock line, and a data line. There may also be two data lines—one for each direction of data flow. Examples of this type of memory are the 93XX and 24XX industry standards. For instance, the 24LC512 manufactured by Microchip Technology, is a serial, 512 Kbit non-volatile memory chip. The 93LC66, also from Microchip Technology, is a serial, 4 Kbit non-volatile memory chip. An example of how a 24LC512 is configured to work with the host processor (the microcontroller in the landscape controller), is illustrated in FIG. 5. The serial clock (SCLK) and data (SDATA) lines from the feature module 88 allow the processor 44 to exchange command or data information with the memory chip 90 inside the feature module 88. FIG. 6 is a flow diagram illustrating a method of writing a byte of data to the memory chip 90. FIG. 7 is a flow diagram illustrating a method of reading a byte of information from the memory chip 90. The main disadvantage of serial memory is that it is slower to access that parallel memory. However, in most cases, it is sufficiently fast for the purpose of an embedded control device, such as a landscape controller, where most of the reads and writes occur in response to user actions, which by their nature are relatively slow events. Serial memory may be either volatile or non-volatile.

Figure 8:
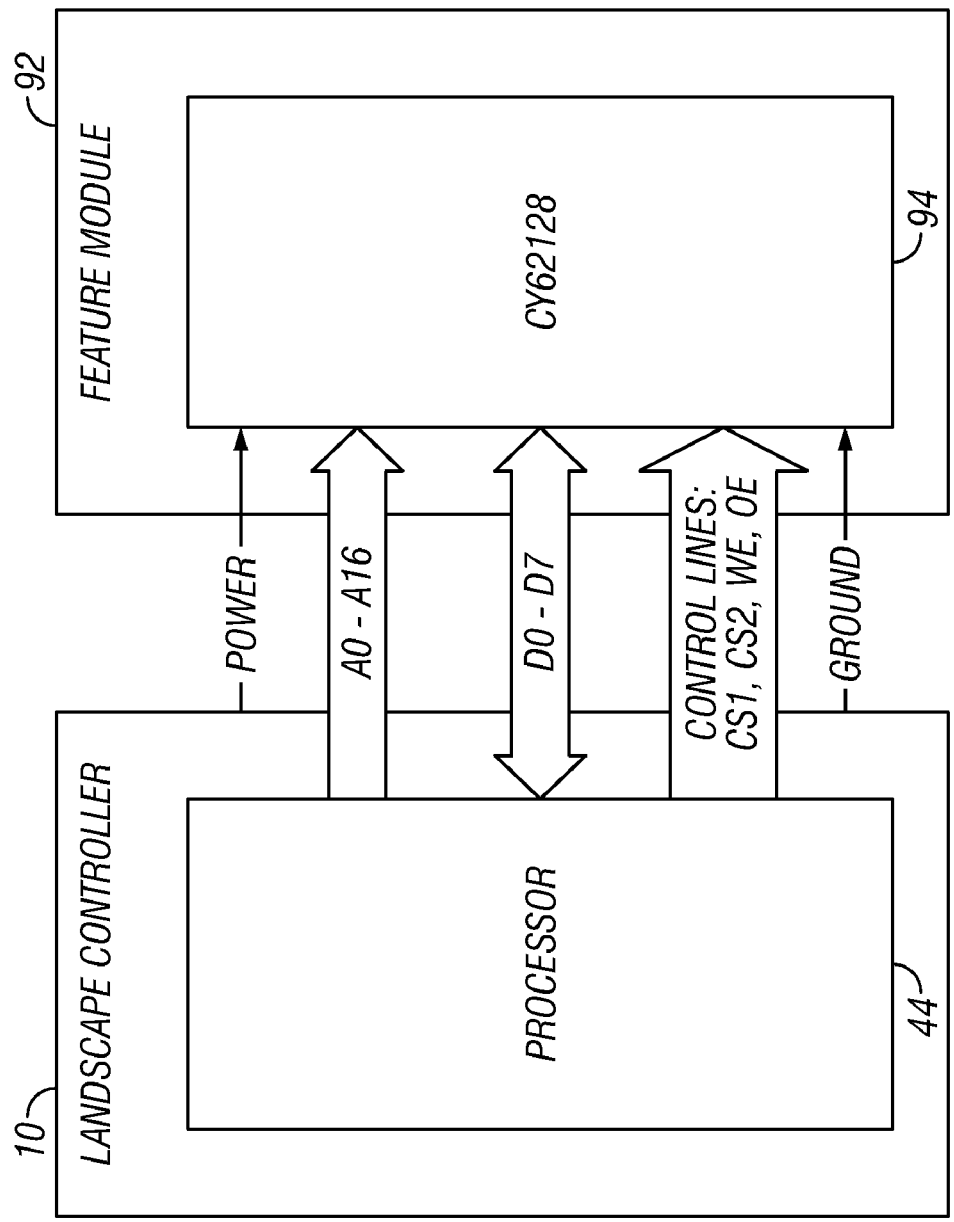
FIG. 8 is a block diagram of the landscape controller of FIG. 1 connected to a feature module with a parallel memory.
Figure 9:
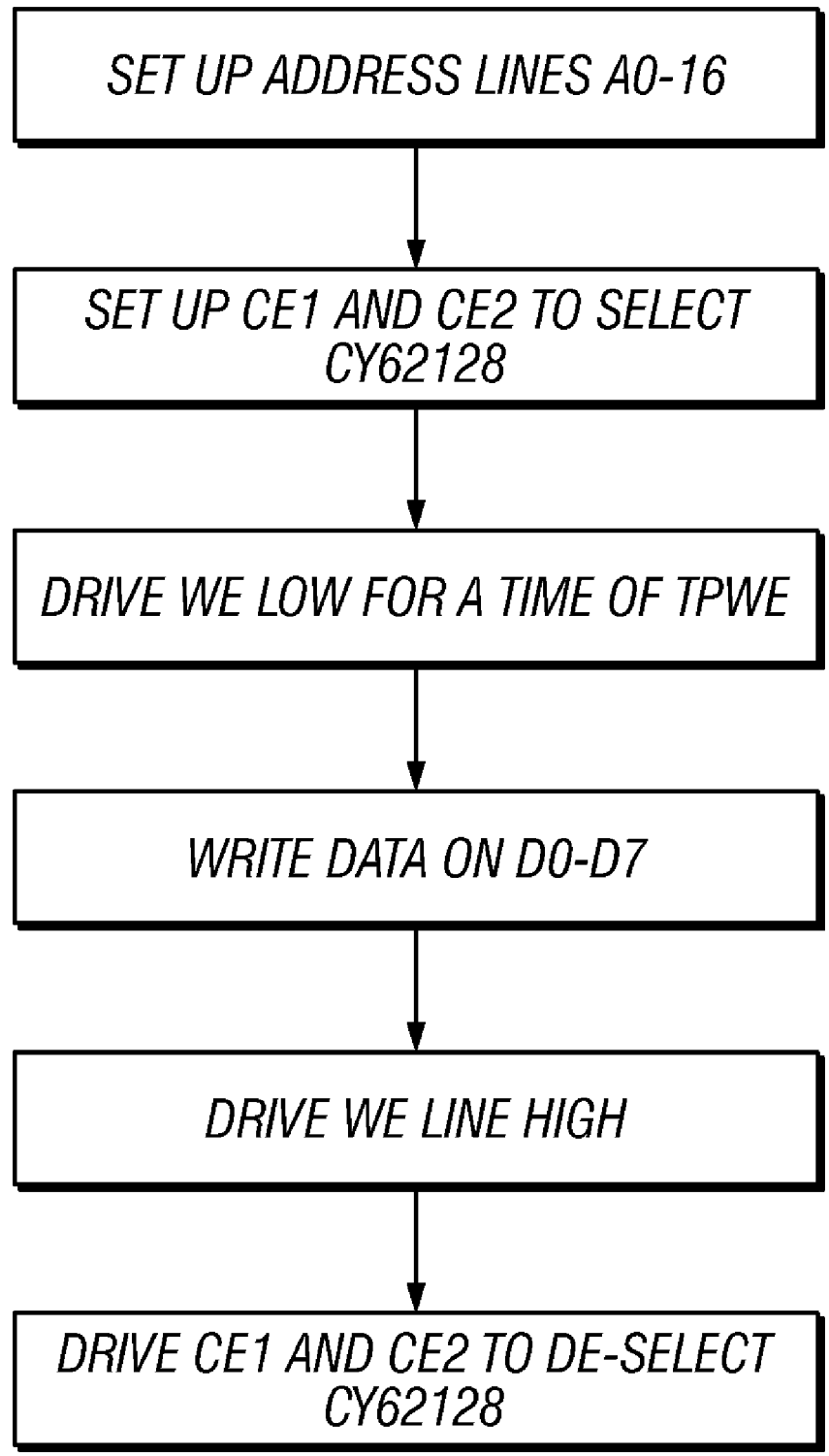
FIG. 9 is a flow diagram illustrating a method of writing a byte of data to the parallel memory chip inside the feature module of FIG. 8.
Figure 10:
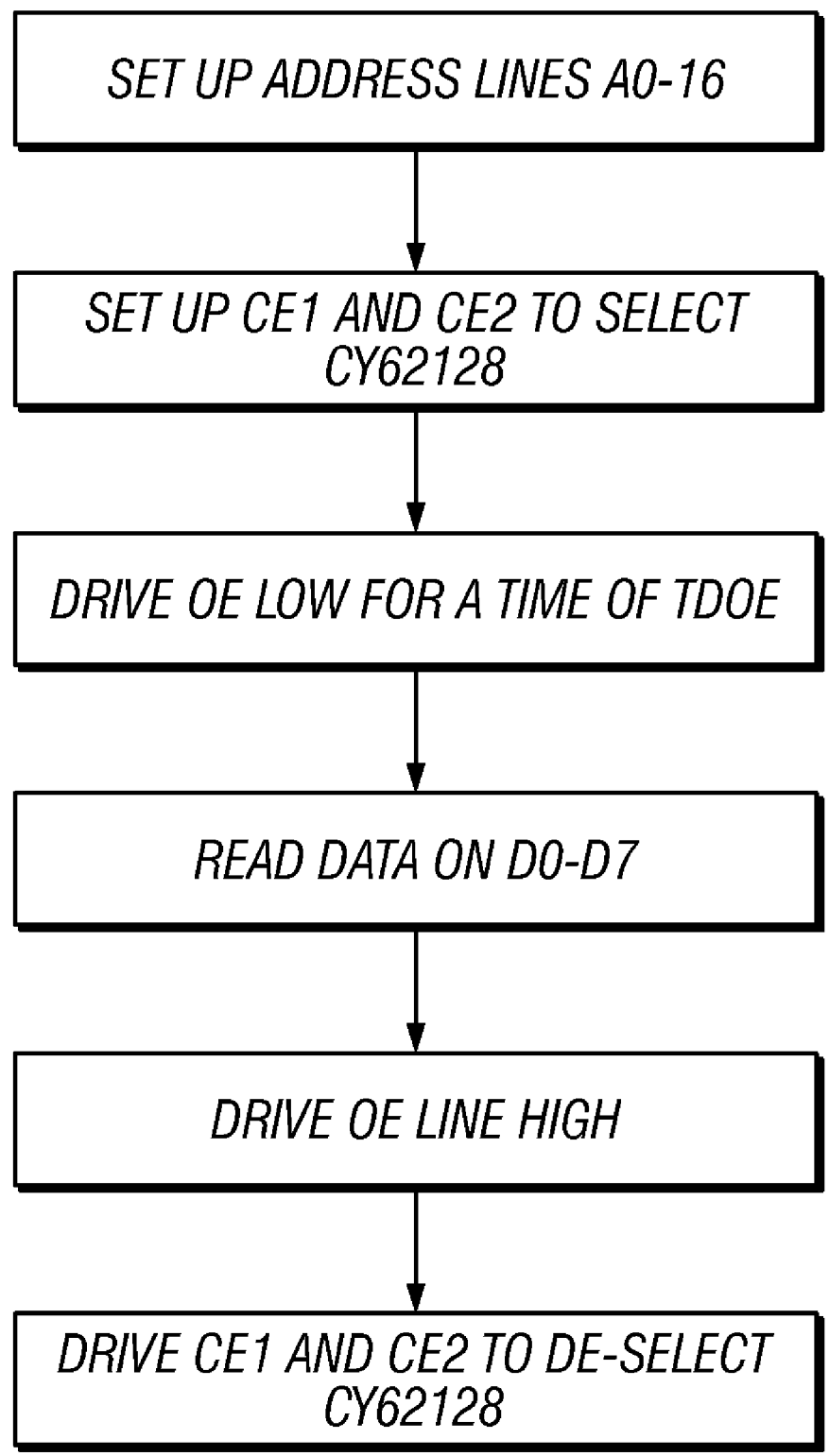
FIG. 10 is flow diagram illustrating a method of reading a byte of data from the parallel memory chip inside the feature module of FIG. 8.

Parallel memory has the advantage that it can be accessed much faster than serial memory. This is because once the address has been set up (all at once), and the chip is enabled, all the data bits appear simultaneously, usually within a few tens or hundreds of nanoseconds. There are usually no clocking operations involved. One example of parallel memory is the CY62128 from Cypress Semiconductor, which is a 128K Byte RAM. An example of how this device can be connected to the processor 44 is illustrated in FIG. 8. The feature module 92 houses a parallel memory chip 94. FIG. 9 is a flow diagram illustrating a method of writing to the parallel memory chip 94. FIG. 10 is a flow diagram illustrating a method of reading from the parallel memory chip 94. Like serial memory, parallel memory may be either volatile, or nonvolatile.

The feature module can be configured as a plug-in memory module that has its own microcontroller on-board. The purpose of this microcontroller is to adapt a memory chip (either serial or parallel) to an industry standard protocol. One example of this is a USB flash or thumb drive. These devices typically have a parallel flash memory chip, such as the Toshiba TC58DVG02A1 connected to a USB-enabled microcontroller such as the Freescale Semiconductor 9S12UF32. The microcontroller manages the implementation of instructions (read/write) over the USB interface, and communicates with the memory chip via its Smart Media Interface. With slightly different firmware, the microcontroller can be adapted to interface to a number of different memory devices, yet the USB interface is standardized.

Figure 11:
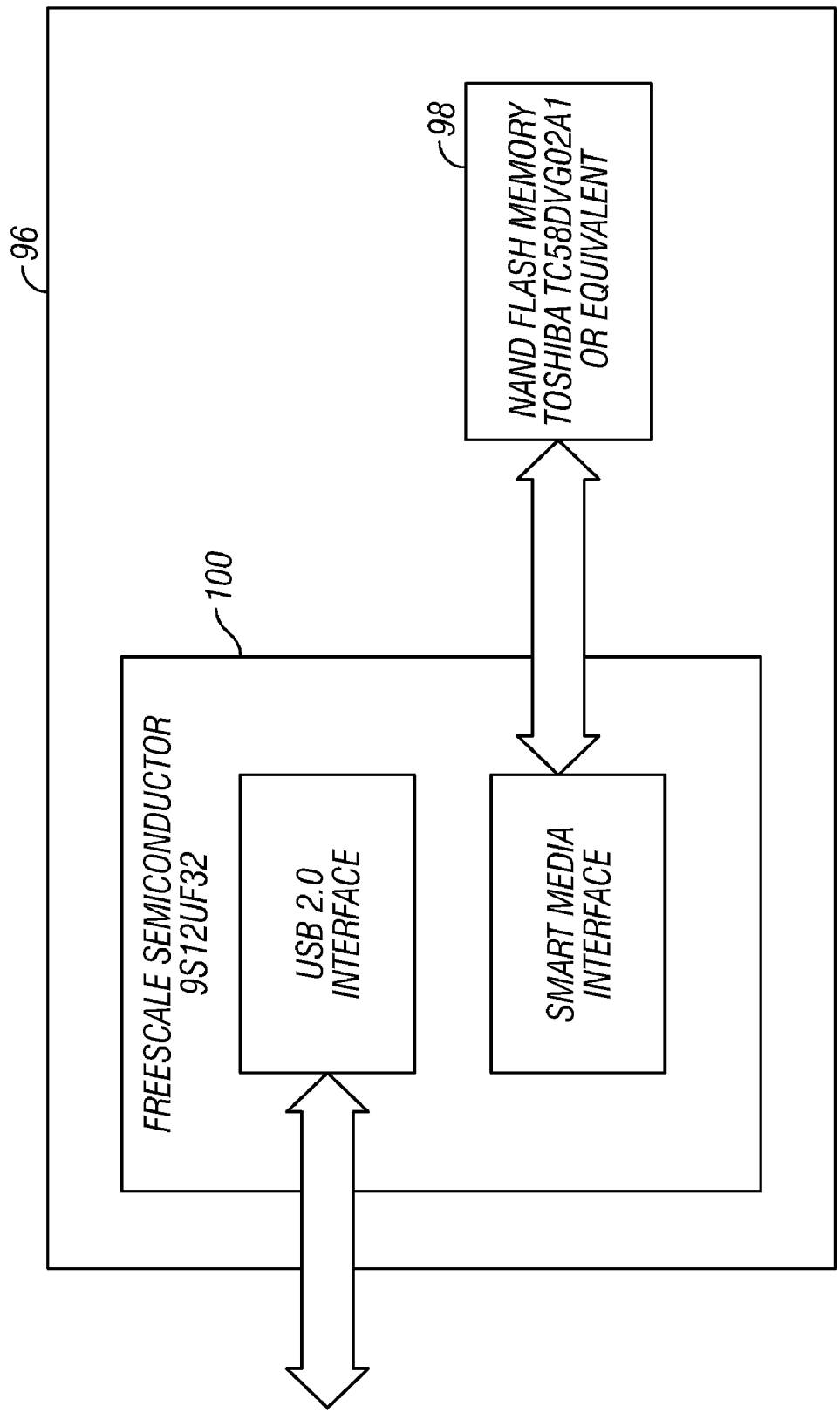
FIG. 11 is a block diagram of a feature module configured like a USB thumb drive

FIG. 11 is a block diagram illustrating a feature module 96 configured like a USB thumb drive. The feature module 96 includes a flash memory 98 and a USB-enabled microcontroller 100. While the feature module 96 includes a USB interface, it should be apparent that this technique can be expanded to cover a variety of physical and protocol layers. For instance, the physical layer may be RS232, or simple TTL level asynchronous data (this is advantageous since most microcontrollers have UART built in that can communicate over such a channel), while the protocol layer may be some proprietary standard. It should also be noted that with onboard intelligence, the data being transmitted to and from the memory module may also be encrypted.

Figure 12:
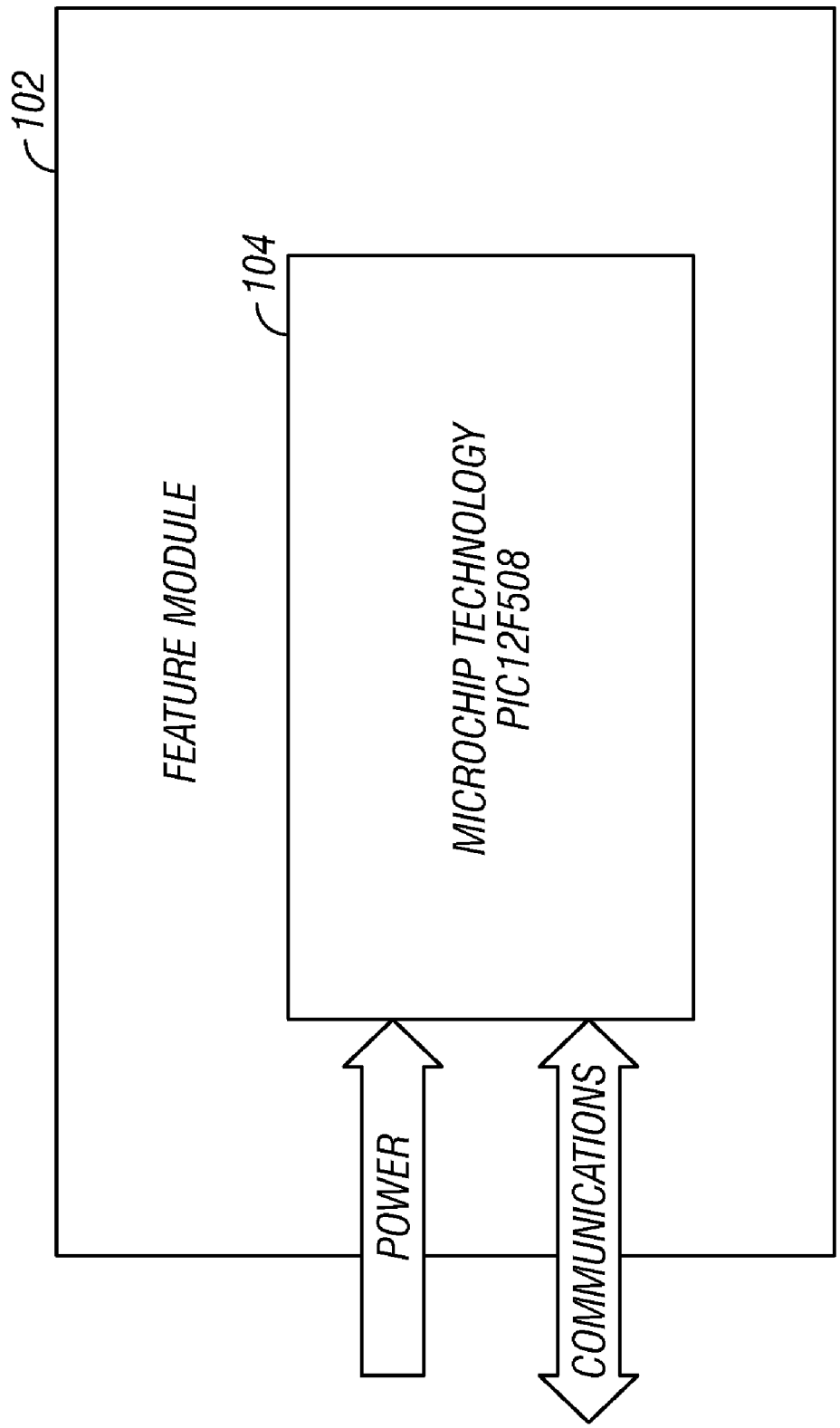
FIG. 12 is a block diagram of a feature module that includes a microcontroller.
Figure 13:
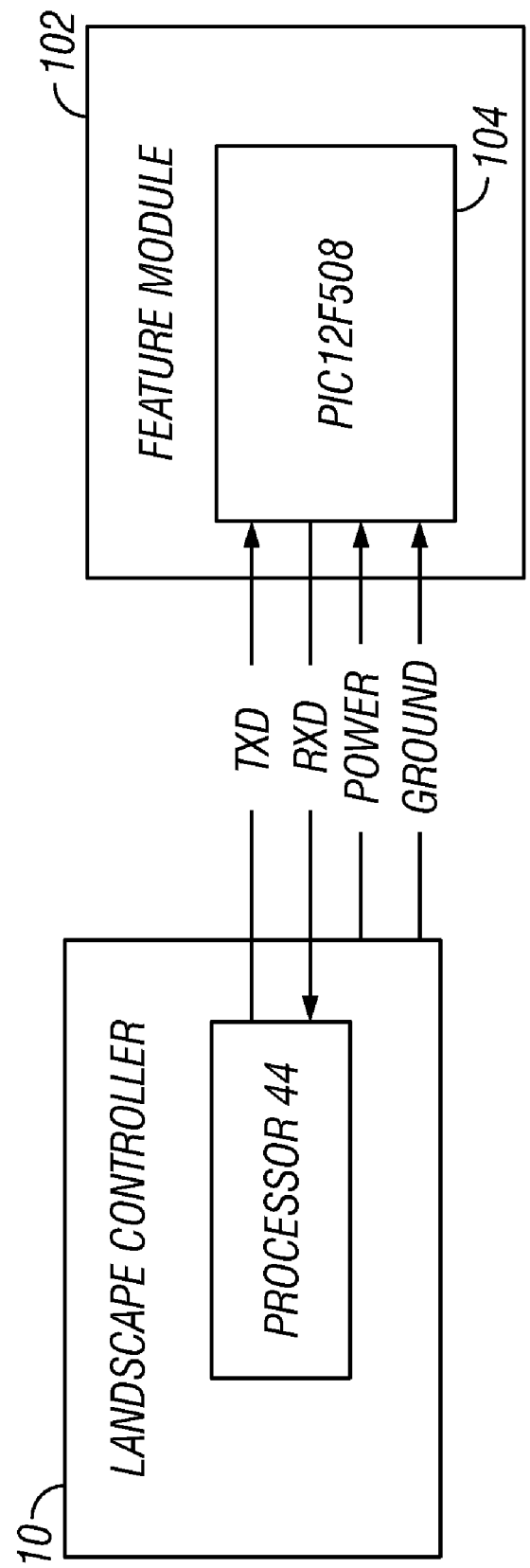
FIG. 13 is a block diagram of a feature module that incorporates an asynchronous communications channel.
Figure 14:
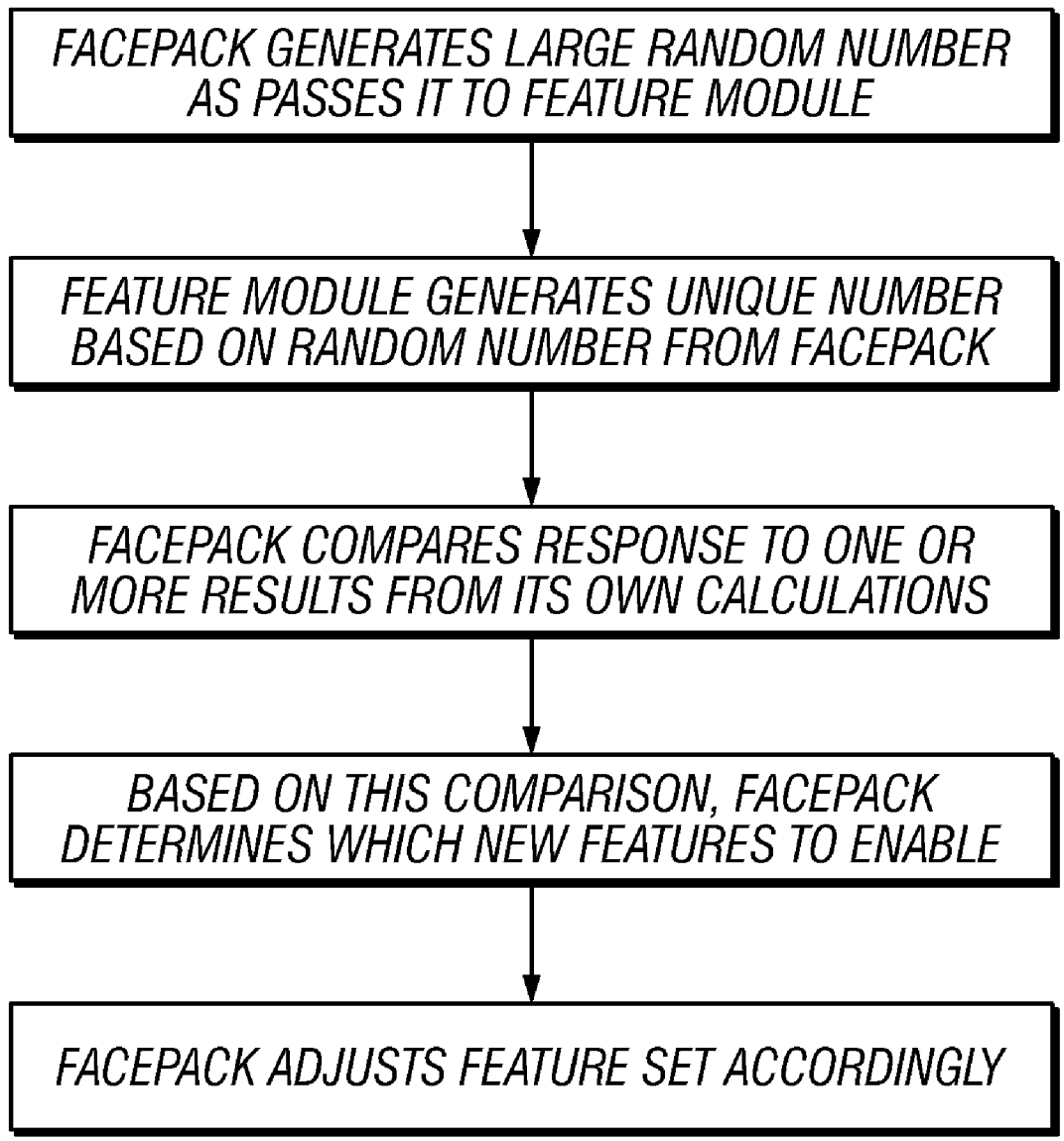
FIG. 14 is a flow diagram illustrating a method of unlocking features preprogrammed into the face pack of the landscape controller of FIG. 1.

As already explained, a feature module can be inserted to enable more, or less functions in the face pack 14. The landscape controller 10 may be sold in a version in which all features already exist in the face pack. In this version, the operational program stored in the PM 56 has all the features that the end user could ever utilize already coded in firmware. When the unit is shipped, some, but not all of these features are active, perhaps for logistic reasons (they may confuse less savvy end users), or for marketing reasons (the end user may be willing to pay more for some features). In either case, the purpose of the feature module 22 is to enable some or all of the features already contained in the face pack code, or to de-feature it. FIG. 12 illustrates a feature module 102 that includes a PIC12F508 microcontroller 104 from Microchip Technology, which incorporates a communication interface to the face pack 14. The feature module 102 may employ a generic asynchronous communication channel as illustrated in FIG. 13, which allows the processor 44 in the face pack 14 to communicate with the microcontroller 104 in the feature module 102 over two data lines, RXD and TXD. The purpose of this communication is to allow the face pack 14 to determine which features to unlock, or to hide. FIG. 14 is a flow diagram illustrating a method of unlocking features pre-programmed into the PM 56 of the face pack 14. Both the face pack code, and the feature module code preferably utilize a data encryption algorithm that generates a unique output number for a unique input number. The processor 44 generates a random number of large size and passes this to the feature module 102. The fact that the number is large makes it difficult or impossible to reverse engineer the algorithm because the number of input/output possibilities is too large. The feature module 102 passes this number through its algorithm and generate a unique response. The processor 44 passes the number through one or several algorithms, each corresponding to a different feature, or set of features. The response from the feature module 102 is compared to the results obtained by the processor 44 in the face pack 14, and the appropriate feature set(s) are enabled.

Figure 15:
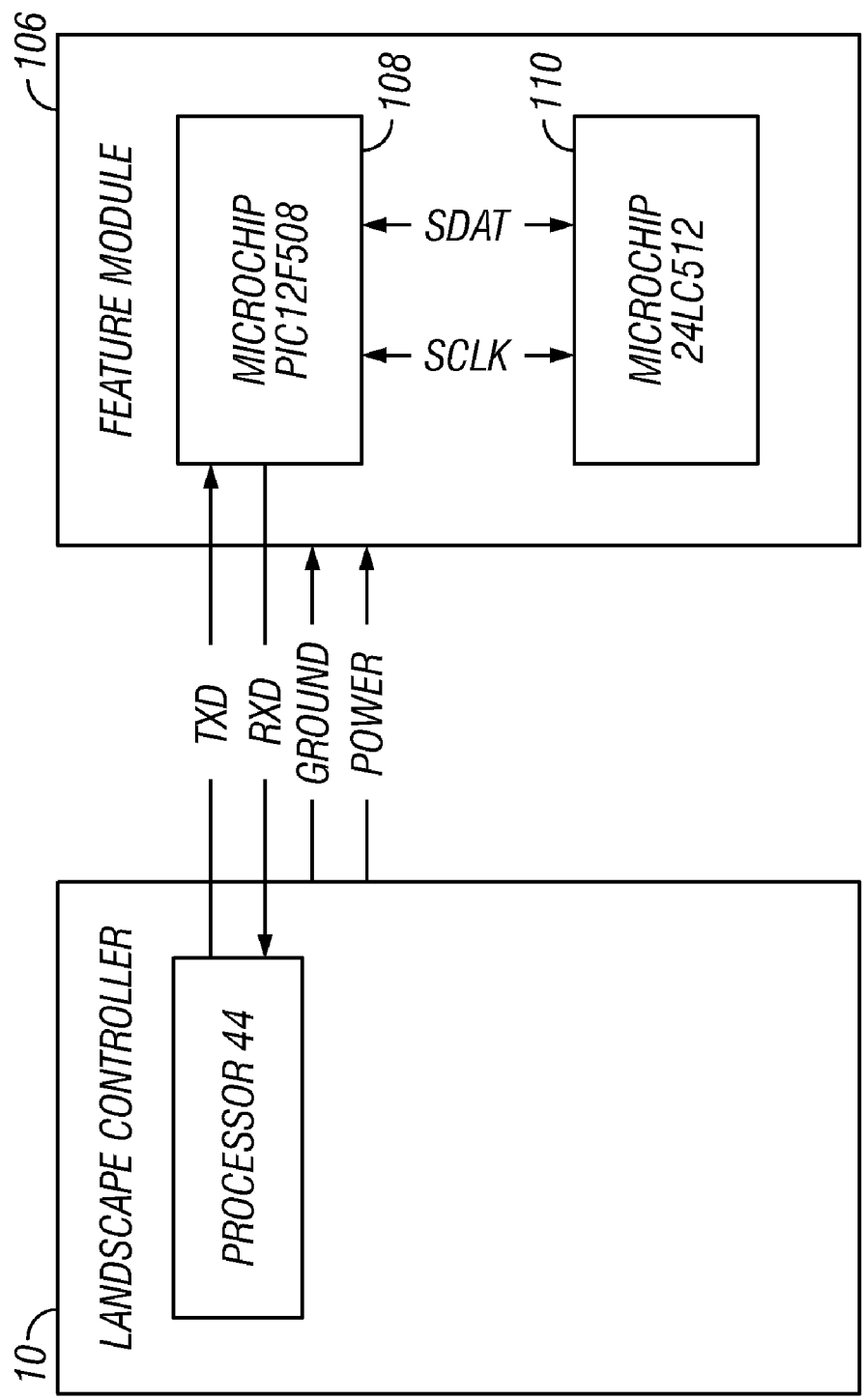
FIG. 15 is a block diagram of a robust feature module.

In another version of the landscape controller 10 all of the features are not already programmed into the PM 56 of the face pack 14. In this version of the landscape controller 10, the face pack does not have a particular feature or features that could be added later with a feature module. In order to accomplish this, new operational code must be programmed into the PM 56 of the face pack 14, or otherwise made available to the processor 44. As discussed above, a memory module could hold code that is re-flashed into the face pack 14. However, such a module may be taken to multiple landscape controllers (even if it was only paid for once), and used to re-flash all of them. This limitation can be overcome in several ways. Part of the new application code could be a routine to periodically go out and check for the presence of the memory module, even though its "services" are no longer needed. Another approach is for the microcontroller to actually execute the code out of the module itself. FIG. 15 illustrates a robust feature module 106 that includes two memory components 108 and 110. The feature module 106 receives a key or cipher from the processor 44 in the face pack 14. This key is used as a seed for encrypting data from the feature module 106 to the face pack 14. This encrypted data represents code and instructions and can be an entirely new program which it re-flashes itself with, or it can be a simple code patch. The term "patch" means a portion of code that is patched over an existing program. The patch may modify only a handful of instructions in the code of the operational program stored in the PM 56, or it may replace an entire functional module in the operational program. A patch does not replace the entire operational program as a full re-flash would accomplish. This new code (patch or entire new operational program) enables features not previously in the operational program of the face pack 14. The processor 44 periodically repeats this process in order to make sure the Feature module is still installed.

Figure 16:
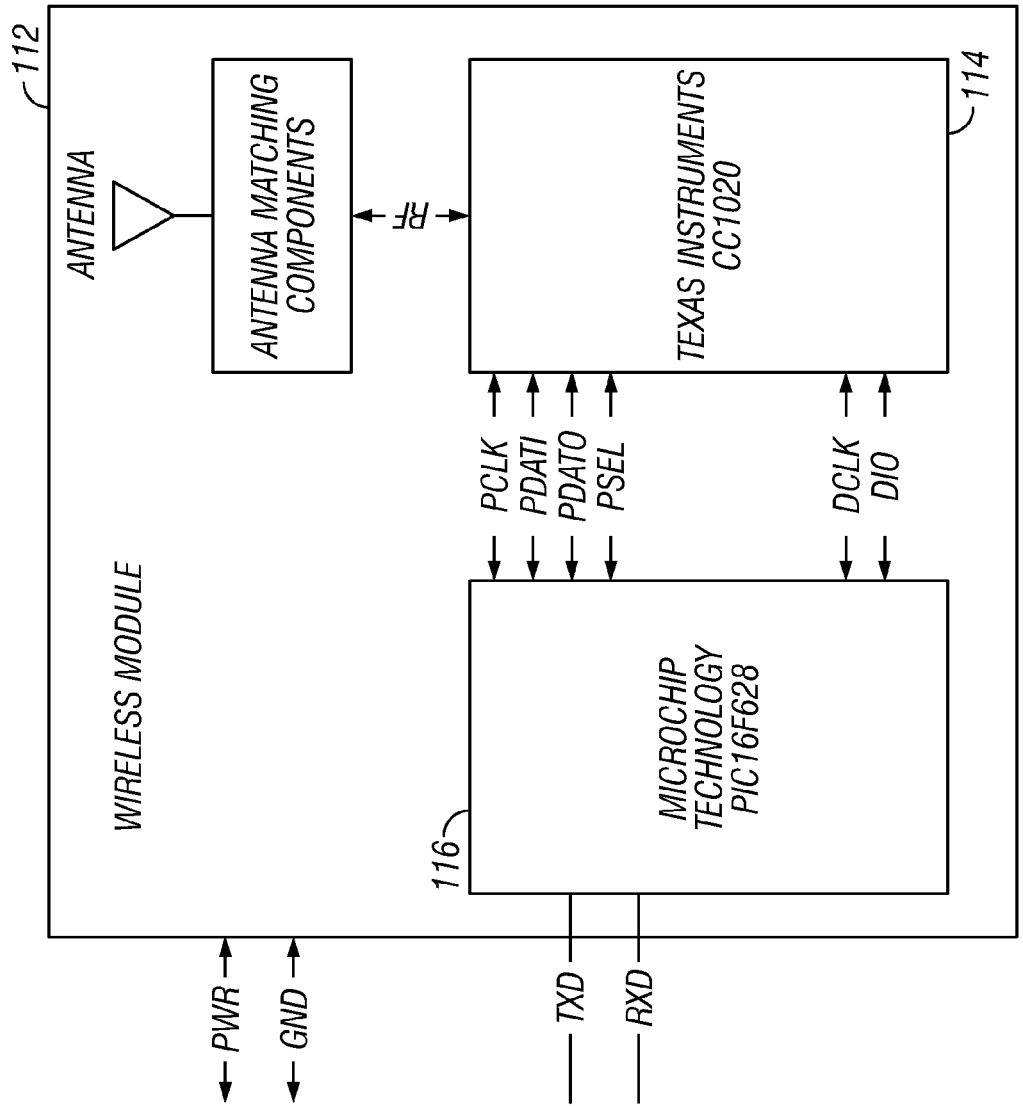
FIG. 16 is a block diagram of a feature module that enables wireless communication between the landscape controller of FIG. 1 and external devices such as environmental sensors.

FIG. 16 illustrates a feature module 112 that allows the face pack 14 to communicate wirelessly with other devices. These other devices may range in scope from sensors (rain, wind, temperature, humidity, solar radiation, soil moisture, etc) to other controllers, or even PC's, blackberry's, Palm® hand held's, cell phones, and other programing or communication devices. The feature module 112 includes a frequency-agile RF transceiver 114, in the form of the CC 1020 transceiver available from Texas Instruments, to communicate with a remote device. A microcontroller 116 in the form of the PIC16F628 microcontroller from Microchip Technology is used to orchestrate the exchange of data between the CC1020 and the processor 44 in the face pack 14. The microcontroller 116 also programs the transceiver 114. There are four connections (PCLK, PDATI, PDATO, PSEL) between the microcontroller 116 and the transceiver 114 that allow the microcontroller 116 to set up the frequency and operating mode of the transceiver 114. There are two additional connections (DCLK and DIO) that allow data to be exchanged between the microcontroller 116 and the transceiver 114. Depending on the nature of this data, the wireless feature module 112 can communicate with a variety of remote devices. The wireless communications feature module 112 can utilize RF, infrared or other wireless circuitry (receiver or transmitter, or transceiver), that allows a remote device to communicate with the face pack 14.

While an embodiment of a landscape controller with a control panel insertable feature module has been described in detail, persons skilled in the art will appreciate that the present invention can be modified in arrangement and detail. For example, the feature module 84 (FIG. 4) could include the functional equivalent of the ET module circuitry illustrated in FIG. 10 of the aforementioned U.S. patent application Ser. No. 12/181,894. This would enable the processor 44 to communicate with an on-site weather station such as that illustrated in FIGS. 12A, 12B and 13 of that application and use the actual ET data acquired to modify its watering schedules to thereby conserve water. Our landscape controller with control panel insertable feature modules could be configured as a modular controller with a plurality of removable station modules, utilizing an electro-mechanical architecture such as those disclosed in the aforementioned U.S. Pat. No. 6,842,667, U.S. Pat. No. 7,069,115 or U.S. application Ser. No. 12/181,894 filed Jul. 29, 2008, the disclosures of which are incorporated by reference herein. Our landscape controller with control panel insertable feature modules could be configured as a decoder controller with at least one removable or fixed encoder device installed to operate multiple valves through multiple decoder circuits. Where our invention is configured as a modular landscape controller, the controller has a plurality of receptacles for each receiving a removable station module that includes a plurality of switch circuits for energizing a plurality of valves. The station modules can releasably connected to the back plane with multi-pin, card edge or other well known electro-mechanical connectors used in the electronics industry to establish multi-path mating electrical connections. In the modular controller form of our invention, each feature module is operatively connectable to the processor through a separate connecting device on the control panel that is not associated with a station module receptacle. The feature modules are physically incompatible with the connecting devices in the station module receptacles and are therefore not interchangeable with any of the station modules. Our landscape controller need not include a removable face pack. Instead, the control panel (including the display and at least one manually actuable control for entering or selecting a watering schedule) could be fixed and non-removable relative to the remainder of the controller and include at least one connector-equipped slot or other non-slot mechanism for operatively connecting a feature module. Therefore, the protection afforded the subject invention should only be limited in accordance with the scope of the following claims.

What is claimed is:

1. A landscape controller, comprising:
   a control panel for entering and/or selecting a watering schedule, the control panel including a first portion of a connecting device;
   a memory having a stored operational program including a watering program for executing the watering schedule;
   a plurality of switch circuits for energizing a plurality of valves;
   a processor connected to the memory and configured to execute the operational program and control the switch circuits in accordance with the watering schedule; and
   at least one feature module including a second portion of the connecting device for mating with the first portion of the connecting device for operatively connecting the feature module to the processor, the feature module having at least one feature selected from the group consisting of:
   a) programming for unlocking at least a portion of a comprehensive set of functional features of the operational program,
   b) additional memory to execute additional features not otherwise executable by the processor,
   c) new programming for execution by the processor, and
   d) a microcontroller and programming to enable the feature module to communicate with sensors.

2. The landscape controller of claim 1 wherein the control panel includes a slot for removably receiving the feature module.

3. The landscape controller of claim 1 wherein the control panel is a removable face pack.

4. The landscape controller of claim 1 wherein the feature module is a USB thumb drive.

5. The landscape controller of claim 1 wherein the feature module and the operational program are configured so that the feature module will only unlock predetermined functional irrigation features on a predetermined controller and not on any other controllers.

6. The landscape controller of claim 1 and further comprising a plurality of receptacles for each receiving a removable station module including a portion of the switching circuits.

7. A landscape controller, comprising:
   a control panel for entering and/or selecting a watering schedule, the control panel including a first portion of a connecting device;
   a memory having a stored operational program including a watering program for executing the watering schedule;

a plurality of receptacles for each receiving a removable station module including a plurality of switch circuits for energizing a plurality of valves;

a processor connected to the memory and configured to execute the operational program and control the switch circuits in accordance with the watering schedule;

at least one feature module including a second portion of the connecting device for mating with the first portion of the connecting device for operatively connecting the feature module to the processor, the feature module having at least one feature selected from the group consisting of:
   a) programming for unlocking at least a portion of a comprehensive set of functional features of the operational program,
   b) additional memory to execute additional features not otherwise executable by the processor,
   c) new programming for execution by the processor, and
   d) a microcontroller and programming to enable the feature module to communicate with sensors.

8. The landscape controller of claim 7 wherein the control panel includes a slot for removably receiving the feature module.

9. The landscape controller of claim 7 and further comprising a housing configured to support the control panel and wherein the control panel is a face pack that is removable from the housing.

10. The landscape controller of claim 7 wherein the feature module is a USB thumb drive.

11. The landscape controller of claim 7 wherein the feature module and the operational program are configured so that the feature module will only unlock predetermined functional irrigation features on a predetermined controller and not on any other controllers.

12. The landscape controller of claim 7 and where the station module is an encoder module that operates a plurality of valves through a plurality of decoder circuits.

13. A landscape controller, comprising:
   a control panel for entering and/or selecting a watering schedule, the control panel including a first portion of a connecting device;
   a memory having a stored operational program including a watering program for executing the watering schedule;
   an encoder circuit for energizing a plurality of valves through decoder circuits;
   a processor connected to the memory and configured to execute the operational program and control a plurality of switch circuits in accordance with the watering schedule; and
   at least one feature module including a second portion of the connecting device for mating with the first portion of the connecting device for operatively connecting the feature module to the processor, the feature module having at least one feature selected from the group consisting of:
      a) programming for unlocking at least a portion of a comprehensive set of functional features of the operational program,
      b) additional memory to execute additional features not otherwise executable by the processor,
      c) new programming for execution by the processor, and
      d) a microcontroller and programming to enable the feature module to communicate with sensors.

* * * * *